United States Patent
Wu et al.

(10) Patent No.: US 7,557,896 B2
(45) Date of Patent: Jul. 7, 2009

(54) LIQUID CRYSTAL DISPLAY PANEL

(75) Inventors: Der-Chun Wu, Taipei County (TW); De-Jiun Li, Taipei County (TW); Hung-Hsiang Chiang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 310 days.

(21) Appl. No.: 11/468,790

(22) Filed: Aug. 31, 2006

(65) Prior Publication Data

US 2008/0055532 A1 Mar. 6, 2008

(51) Int. Cl.
G02F 1/1339 (2006.01)
(52) U.S. Cl. ........................................ 349/156; 349/155
(58) Field of Classification Search ................. 349/156, 349/155
See application file for complete search history.

(56) References Cited

U.S. PATENT DOCUMENTS

| 6,760,089 | B1 | 7/2004 | Kuroha |
| 6,954,250 | B2 | 10/2005 | Kuroha |
| 2003/0071956 | A1 | 4/2003 | Sasaki et al. |
| 2007/0002265 | A1* | 1/2007 | Kwak et al. .................. 349/156 |

FOREIGN PATENT DOCUMENTS

| JP | 2002-182220 | 6/2002 |
| JP | 2004-032465 | 1/2004 |
| JP | 2004-205549 | 7/2004 |

* cited by examiner

*Primary Examiner*—Richard H Kim
(74) *Attorney, Agent, or Firm*—Jianq Chyun IP Office (57) ABSTRACT

A liquid crystal display panel includes a first substrate; a plurality of scan lines and a plurality of data lines disposed on the first substrate; an insulation layer disposed between the scan line and the data line; a plurality of thin film transistors (TFT), each TFT including a gate, a channel layer, a source, and a drain; a plurality of pixel electrodes; a plurality of retaining wall patterns disposed on the insulation layer and the material thereof is selected from at least one of the source/drain and channel layer; a second substrate disposed opposite to the first substrate; a liquid crystal layer between the first and second substrate; and a plurality of pillar spacers between the first and second substrate, wherein one end of the pillar spacer is disposed inside the retaining wall pattern.

6 Claims, 9 Drawing Sheets

LIQUID CRYSTAL DISPLAY PANEL

BACKGROUND OF THE INVENTION

1. Field of Invention

The present invention relates to a display panel and a fabricating method thereof. More particularly, the present invention relates to a liquid crystal display panel and a fabricating method thereof.

2. Description of Related Art

In modern society, multimedia technologies have been highly developed, benefiting from the progress of semiconductor devices or display units. As for displays, liquid crystal displays with the advantages of high quality picture, preferable space utilization, low power consumption, and no radiation, have gradually become mainstream products in the market.

A liquid crystal display panel generally comprises two substrates and a liquid crystal layer sandwiched therebetween. In order to keep the height of the gap between the two substrates, multiple spacers are commonly disposed between the two substrates. However, since conventional spacers are simply placed against between the two substrates, when the liquid crystal display panel is subjected to a lateral stress, the two substrates easily become mismatched with each other, thereby resulting in abnormal display phenomena such as light leakage and dimness.

Figure 1:
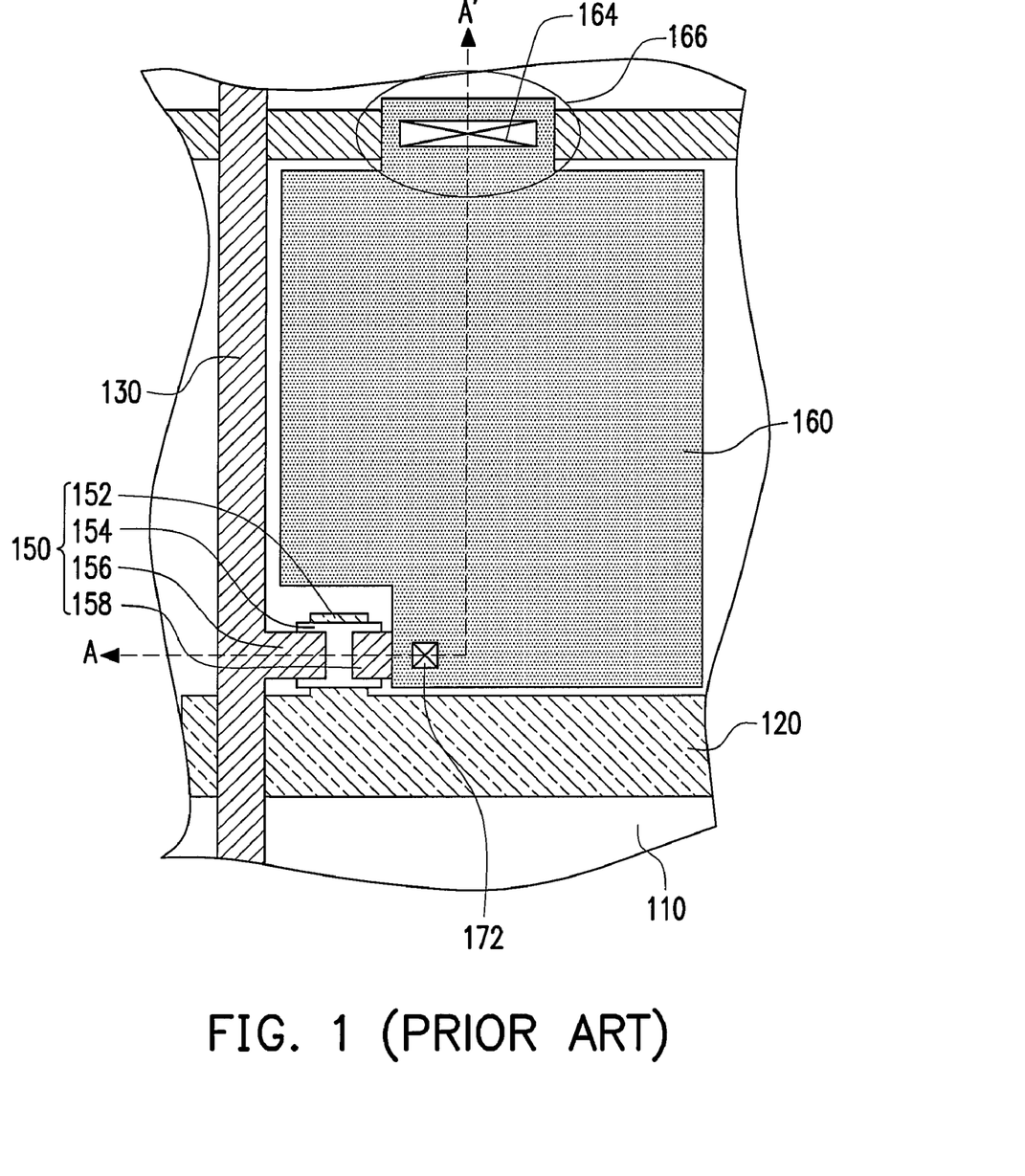
FIG. 1 is a schematic top view of the TFT array substrate of the conventional liquid crystal display panel.
Figure 2:
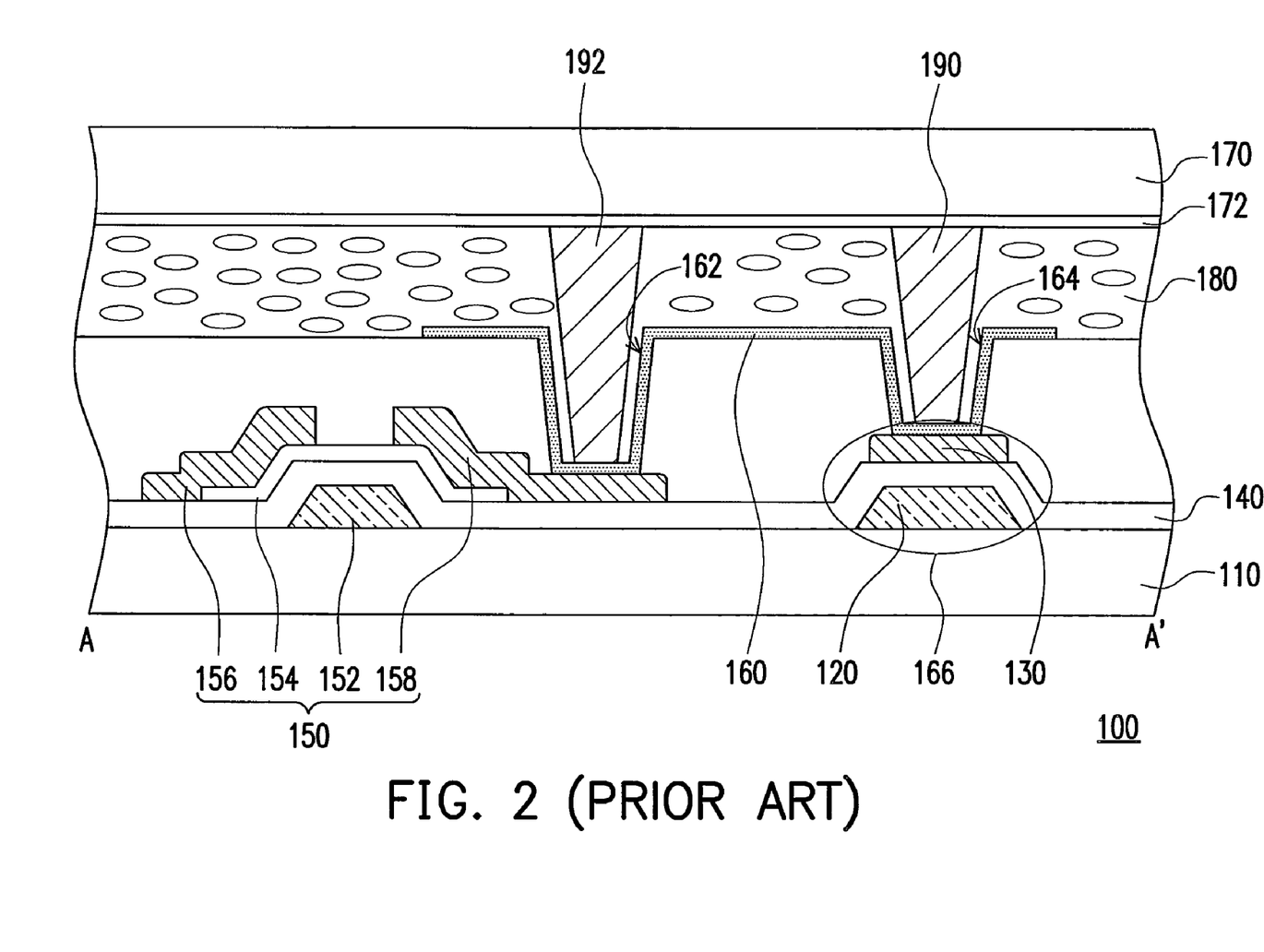
FIG. 2 is a sectional view of the conventional liquid crystal display panel along Line A-A' in FIG. 1.

In order to solve the aforementioned problems, a solution has been provided. FIG. 1 is a schematic top view of a TFT array substrate of a conventional liquid crystal display panel and FIG. 2 is a sectional view of the conventional liquid crystal display panel along Line A-A' in FIG. 1. Referring to FIGS. 1 and 2 together, the structure of a liquid crystal display panel 100 shown in FIG. 2 comprises a first substrate 110, a plurality of scan lines 120 (only one scan line is shown in the figures), a plurality of data lines 130 (only one data line is shown in the figures), an insulation layer 140, a plurality of TFTs 150 (only one TFT is shown in the figures), a plurality of pixel electrodes 160 (only one pixel electrode is shown in the figures), a second substrate 170, a liquid crystal layer 180, and a plurality of pillar spacers 190 or/and pillar spacers 192 (the drawing shows one pillar spacer 190 and one pillar spacer 192). The data line 130 and the scan line 120 are disposed on the first substrate 110. The insulation layer 140 is disposed between the data line 130 and the scan line 120. The TFT 150 is disposed on the first substrate 110 and comprises a gate 152, a channel layer 154, a source 156, and a drain 158. The gate 152 is electrically connected to the scan line 120. The source 156 is electrically connected to the data line 130. The drain 158 is electrically connected to the pixel electrode 160 through a contact window 162. Furthermore, the pixel electrode 160 is electrically connected to a capacitor 166 through another contact window 164. An electrode layer 172 and the pillar spacer 190 are disposed on the second substrate 170. Then, the first substrate 110 and the second substrate 170 are assembled together, such that another end of the pillar spacer 190 is disposed inside the contact window 164. The liquid crystal layer 180 is disposed between the first substrate 110 and the second substrate 170. The aforementioned technology is disclosed in Japanese Patent Publication No. JP-2004-302465.

In addition to the aforementioned pillar spacer 190 disposed inside the contact window 190, in other conventional arts, the pillar spacer 192 can also be disposed inside the contact window 162.

However, no matter that the pillar spacer 190 or 192 is disposed inside the contact window 162 or 164 to be caught, when a user wipes the surface of the liquid crystal display panel 100, a lateral stress is generated, and thus a shift of the pillar spacers 190, 192 occurs and cannot be easily remedied. The apertures of the contact windows 162 and 164 are so small such that it is difficult for the pillar spacers 190 and 192 to return into the contact windows 162 and 164 after shifting. This results in abnormal display phenomena of the liquid crystal display panel 100 such as light leakage and dimness.

SUMMARY OF THE INVENTION

Accordingly, the objective of the present invention is to provide a liquid crystal display panel to solve the problems such as light leakage and dimness of the liquid crystal display panel.

Another objective of the present invention is to provide another liquid crystal display panel to eliminate the phenomena such as light leakage and dimness of the liquid crystal display panel, thereby maintaining the contrast of the liquid crystal display panel.

Still another object of the present invention is to provide a method of fabricating a liquid crystal display panel to eliminate the phenomena such as light leakage and dimness of the liquid crystal display panel, thereby maintaining the contrast and brilliance uniformity of the liquid crystal display panel.

The liquid crystal display panel provided by the present invention comprises a first substrate, a plurality of scan lines, a plurality of data lines, an insulation layer, a plurality of TFTs, a plurality of pixel electrodes, a plurality of retaining wall patterns, a second substrate, a liquid crystal layer, and a plurality of pillar spacers. The scan lines and the data lines are disposed on the first substrate. The insulation layer is disposed between the scan lines and the data lines. The TFTs are disposed on the first substrate. Each of the TFTs comprises a gate, a channel layer, a source, and a drain. The gate is electrically connected to one of the scan lines. The source is electrically connected to one of the data lines. Each of the pixel electrodes is electrically connected to the drain of one of the TFTs. The retaining wall patterns are disposed on the insulation layer. The second substrate is disposed opposite to the first substrate and the liquid crystal layer is disposed between the first substrate and the second substrate. The pillar spacers are disposed between the second substrate and the first substrate and one end of each pillar spacer is disposed inside one of the retaining wall patterns on the first substrate.

In one embodiment of the present invention, the retaining wall patterns are disposed on the insulation layer over the scan lines.

In one embodiment of the present invention, each of the retaining wall patterns is a single layer structure and the material thereof is the same as that of the source and drain.

In one embodiment of the present invention, each of the retaining wall patterns is a single layer structure and the material thereof is the same as that of the channel layer.

In one embodiment of the present invention, each of the retaining wall patterns comprises an upper layer and a lower layer, wherein the material of the lower layer is the same as that of the channel layer and the material of the upper layer is the same as that of the source and drain.

In one embodiment of the present invention, each of the pillar spacers is disposed inside each of the retaining wall patterns and the distance between the pillar spacer and the retaining wall pattern is larger than 3 μm.

In one embodiment of the present invention, the retaining wall patterns are continuous retaining wall patterns or discontinuous retaining wall patterns.

In one embodiment of the present invention, the liquid crystal display panel further comprises a color filter array disposed on the second substrate and the pillar spacers are disposed on the color filter array.

In one embodiment of the present invention, the liquid crystal display panel further comprises an electrode layer disposed on the second substrate and the pillar spacers are disposed on the electrode layer.

The present invention provides another liquid crystal display panel, which comprises a first substrate, a pixel array, a color filter array, a second substrate, a plurality of protrusions, a plurality of retaining wall patterns, a liquid crystal layer, and a plurality of pillar spacers. The pixel array is disposed on the first substrate. Each of pixels comprises a scan line, a data line, a TFT, and a pixel electrode. The color filter array is disposed on the pixel array. The second substrate is disposed opposite to the first substrate. The protrusions are disposed on the second substrate. The retaining wall patterns are disposed on the second substrate. The liquid crystal layer is disposed between the first substrate and the second substrate. The pillar spacers are disposed between the second substrate and the first substrate. One end of each pillar spacer is disposed inside one of the retaining wall patterns on the second substrate.

In one embodiment of the present invention, each of the pillar spacers is disposed inside each of the retaining w all patterns and the distance between the pillar spacer and the retaining wall pattern are larger than 3 µm.

In one embodiment of the present invention, the retaining wall patterns are continuous retaining wall patterns or discontinuous retaining wall patterns.

In one embodiment of the present invention, the liquid crystal display panel of the present invention further comprises an electrode layer disposed on the second substrate and the pillar spacers are disposed on the electrode layer.

In one embodiment of the present invention, the material of the wall patterns is the same as that of the protrusions.

The present further provides a method of fabricating a liquid crystal display panel. The fabricating method comprises first providing a substrate. A plurality of gates and a plurality of scan lines electrically connecting to the gates are formed on the first substrate. Then, an insulation layer is formed to cover the gates and scan liens and a channel layer is formed on the insulation layer over each of the gates. Subsequently, a source and a drain are formed on each of the channel layers and a data line electrically connected to each of the source is formed. A plurality of retaining wall patterns are formed on the insulation layer when at least one of the channel and the source and drain is formed. After that, a plurality of pixel electrodes are formed, wherein each pixel electrode is electrically connected to each of the drains. Next, a second substrate is provided and a plurality of pillar spacers are formed on the second substrate. Finally, the first substrate and the second substrate are assembled, and a liquid crystal layer is filled between the first substrate and the second substrate, wherein the pillar spacers formed on the second substrate insert into the retaining wall patterns.

In one embodiment of the present invention, the retaining wall patterns are formed on the insulation layer over the scan lines.

In one embodiment of the present invention, the retaining wall patterns and the source and drain are formed are at the same time.

In one embodiment of the present invention, the retaining wall patterns and the channel layer are formed at the same time.

In one embodiment of the present invention, each of the retaining wall patterns comprises an upper layer and a lower layer. The lower layer is formed when the channel layer is formed and the upper layer is formed when the source and drain are formed.

In one embodiment of the present invention, the distance between the pillar spacer disposed inside each of the retaining wall patterns and the retaining wall pattern is larger that 3 µm.

In one embodiment of the present invention, the retaining wall patterns are continuous retaining wall patterns or discontinuous retaining wall patterns.

In one embodiment of the present invention, before the pillar spacers are formed, a color filter array is further formed on the second substrate.

In one embodiment of the present invention, before the pillar spacers are formed, an electrode layer is further formed on the second substrate.

The present invention also provides a method of a fabricating the liquid crystal display panel. A first substrate is provided. A pixel array is formed on the first substrate wherein each pixel includes a scan line, a data line, a TFT, and a pixel electrode. After a color filter array is formed on the pixel array, a plurality of pillar spacers are formed over the color filter array. On the other hand, a second substrate is provided. A plurality of protrusions and a plurality of retaining wall patterns are formed on the second substrate at the same time. Thereafter, the first substrate and the second substrate are assembled and a liquid crystal layer is filled between the first substrate and the second substrate, wherein the pillar spacers formed on the first substrate insert into the retaining wall patterns.

In one embodiment of the present invention, a distance between the pillar spacer disposed inside each of retaining wall patterns and the retaining wall pattern is larger than 3 µm.

In one embodiment of the present invention, the retaining wall patterns are continuous retaining wall patterns or discontinuous retaining wall patterns.

In one embodiment of the present invention, the method further comprises forming an electrode layer on the second substrate before forming the protrusions and the retaining wall patterns.

In the present invention, since one end of the pillar spacer is disposed inside the retaining wall pattern, the problem that the pillar spacer shifts when the liquid crystal display panel is subjected to a lateral stress is avoided, such that the phenomena of light leakage and dimness of the liquid crystal display panel are avoided. Additionally, since the retaining wall patterns of the present invention can be integrated in the original process of fabricating the liquid crystal display panel, additional masks and process steps are not required in the method of the present invention.

In order to the make aforementioned and other objects, features and advantages of the present invention comprehensible, a preferred embodiment accompanied with figures are described in detail below.

It is to be understood that both the foregoing general description and the following detailed description are exemplary, and are intended to provide further explanation of the invention as claimed.

DESCRIPTION OF EMBODIMENTS

The First Embodiment

Figure 3:
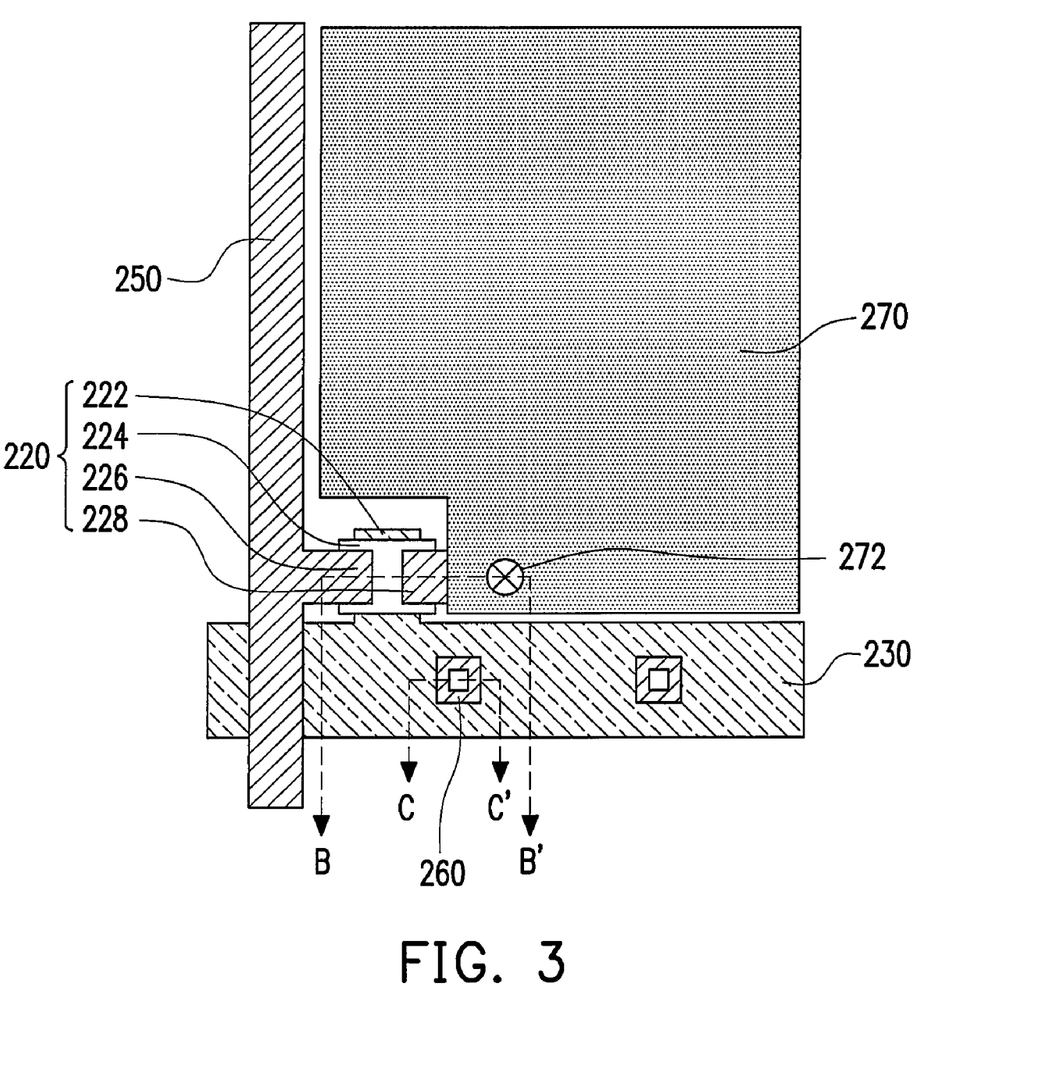
FIG. 3 is a schematic top view of one of the pixels of the TFT array substrate of the liquid crystal display panel according to one embodiment of the present invention.
Figure 4:
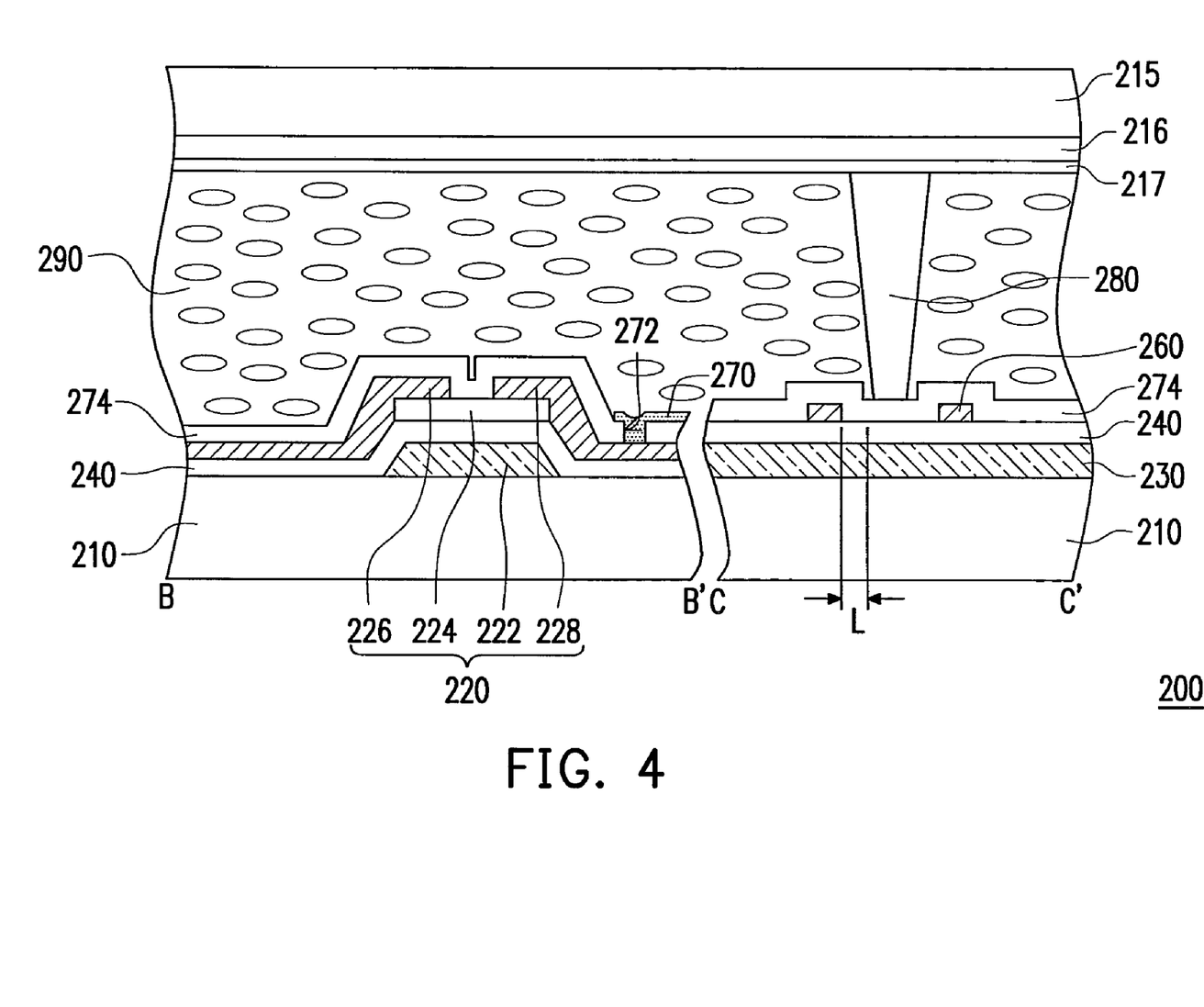
FIG. 4 is a sectional view of the liquid crystal display panel along Lines B-B' and C-C' in FIG. 3.
Figure 5A:
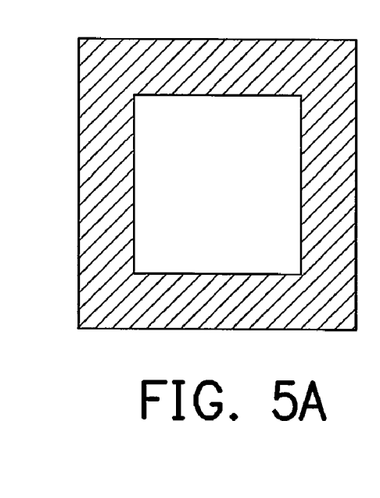
FIGS. 5A-5F show the retaining wall pattern having a continuous pattern according to the present invention.
Figure 5B:
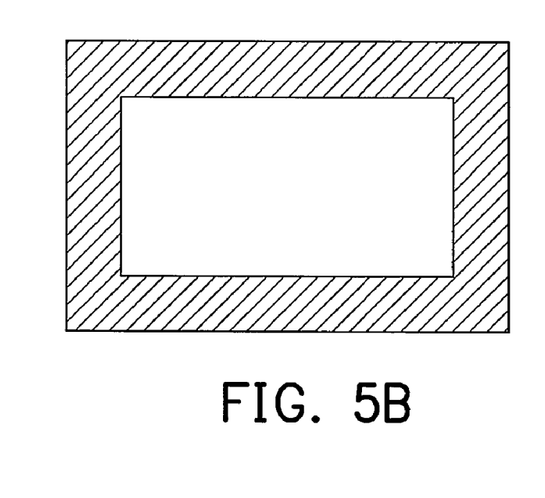
Figure 5C:
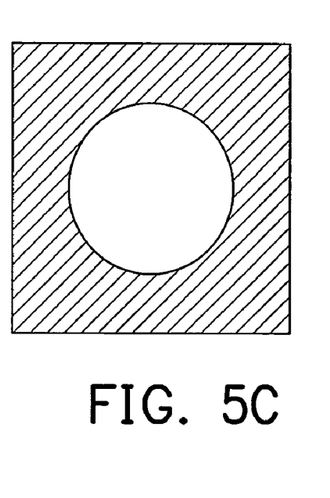
Figure 5D:
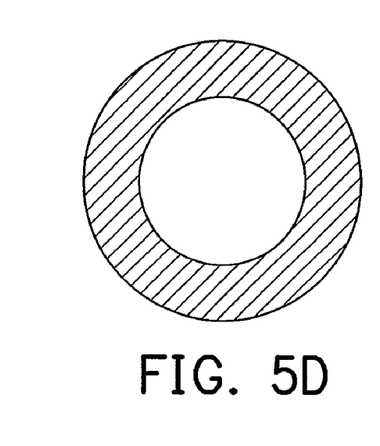
Figure 5E:
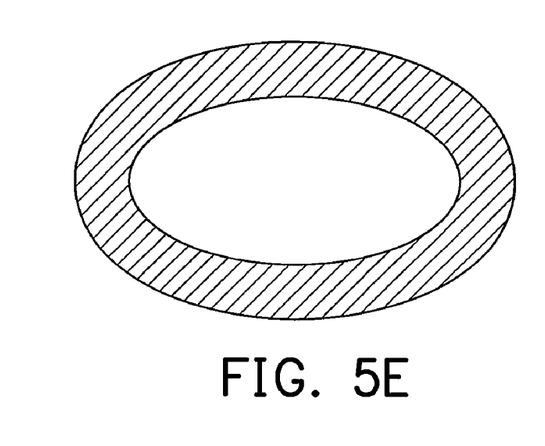
Figure 5F:
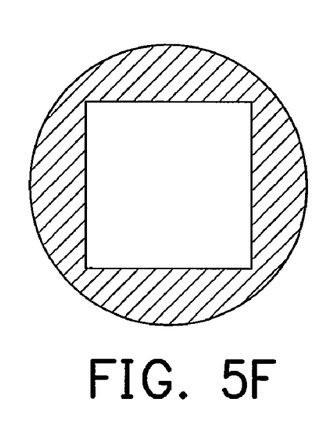
Figure 5G:
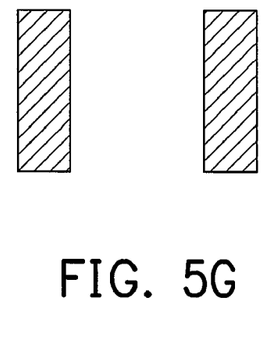
FIGS. 5G-5L show the retaining wall pattern having a discontinuous pattern according to the present invention.
Figure 5H:
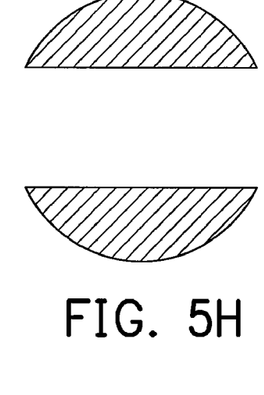
Figure 5I:
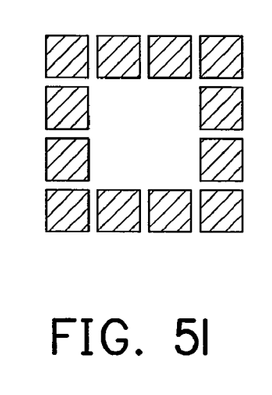
Figure 5J:
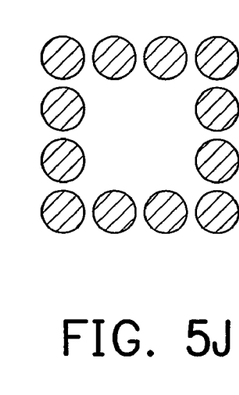
Figure 5K:
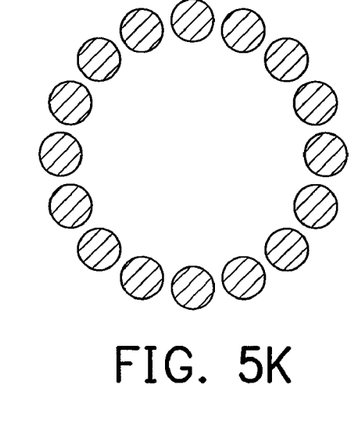
Figure 5L:
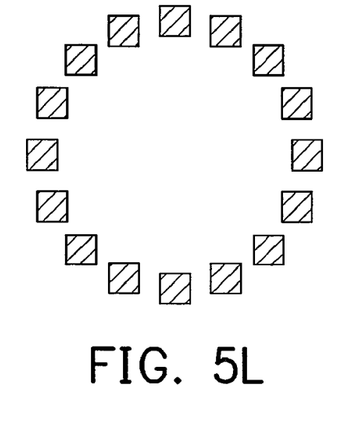

FIG. 3 is a schematic top view of one of the pixels of the TFT array substrate of the liquid crystal display panel according to one embodiment of the present invention. FIG. 4 is a sectional view of the liquid crystal display panel along Lines B-B' and C-C' in FIG. 3. Referring to FIGS. 3 and 4 together, the method of fabricating a liquid crystal display panel 200 comprises the steps as follows. First, a first substrate 210 is provided and a TFT process is performed on the first substrate 210. A plurality of gates 222 (only one gate is shown in the figures) and a plurality of scan lines 230 (only one scan line is shown in the figures) electrically connected to the gates 222 are formed on the first substrate 210. The forming method thereof comprises, for example, depositing a film layer and then performing an exposure process, a development process, and an etching process. After forming the gate 222 and the scan line 230, an insulation layer 240 is formed to cover the gate 222 and the scan line 230, for example, in a manner of depositing process. After that, a channel layer 224 is formed on the insulation layer 240 over the gate 222, and the forming method for forming the channel layer comprises, for example, depositing a film layer and then performing a exposure process by using a mask, a development process, and an etching process. Subsequently, a source 226 and a drain 228 are formed on the channel layer 224 and a data line 250 electrically connected to the source 226 is formed. In the meanwhile, a plurality of retaining wall patterns 260 (only one retaining wall pattern is shown in the figures) are formed on the insulation layer 240 when the source 226 and the drain 228 are formed. More specifically, after the channel layer 224 is formed, a design of the retaining wall pattern is additionally added into the mask with the source and the drain. And then, the retaining wall patterns 260 are formed at the same time when the exposure process and the development process are performed to form the source 226 and the drain 228. Therefore, the material of the retaining wall patterns 260 is the same as that of the source 226 and the drain 228 and the height of the retaining wall patterns 260 is the same as or similar to that of the source 226 and the drain 228.

The retaining wall patterns 260 may be continuous patterns as shown in FIGS. 5A-5F, or discontinuous patterns as shown in FIGS. 5G-5L.

Then, referring to FIG. 4, a passivation layer 274 is formed on the first substrate 210 and a plurality of pixel electrodes 270 (only one pixel electrode is shown in the figure) are further formed. The pixel electrode 270 is electrically connected to the drain 228 through a contact window 272. After that, a second substrate 215 is provided and a plurality of pillar spacers 280 are formed on the second substrate 215.

And finally, the first substrate 210 and the second substrate 215 are assembled and a liquid crystal layer 290 is filled between the first substrate 210 and the second substrate 215. Each of the pillar spacers 280 formed on the second substrate 215 is disposed inside one of the retaining wall patterns 260.

According to an embodiment of the present invention, before the pillar spacers 280 are formed, a color filter array 216 is first formed on the second substrate 215. The color filter array has, for example, a black matrix and a plurality of color filter patterns. Then, an electrode layer 217 is formed on the color filter array 216 and then the pillar spacers 280 are formed. However, in the embodiment, the second substrate 215 is not limited to including the color filter array 216 and the electrode layer 217.

Additionally, the material of the pillar spacers 280 is, for example, photoresist material and the method of forming the pillar spacers 280 comprises, for example, coating the photoresist material; and performing an exposure process and a development process on the photoresist material so as to form the pillar spacers 280.

After finishing the aforementioned steps, the formed liquid crystal display panel 200 is as shown in FIGS. 3 and 4, i.e., the scan line 230 and the data line 250 are disposed on the first substrate 210. The insulation layer 240 is disposed between the scan line 230 and the data line 250. The TFT 220 is disposed on the first substrate 210 and comprises the gate 222, the channel layer 224, the source 226, and the drain 228. The gate 222 is electrically connected to the scan line 230 and the source 226 is electrically connected to the data line 250. The passivation layer 274 covers the TFT 220. The pixel electrode 270 is formed on the passivation layer 274 and electrically connected to the drain 228 of the TFT 220. The retaining wall patterns 260 are disposed on the insulation layer 240 on the scan line 230. The second substrate 215 is disposed opposite to the first substrate 210 and the liquid crystal layer 290 is disposed between the first substrate 210 and the second substrate 215. The pillar spacers 280 are disposed between the second substrate 215 and the first substrate 210, and one end of each pillar spacer 280 is disposed inside one of the retaining wall pattern 260 on the first substrate 210.

In one preferred embodiment, the diameter of the pillar spacer 280 is, for example, in a range of 10 μm to 46 μm, and the distance between the pillar spacer 280 and the retaining wall pattern 260 is, for example, larger than 3 μm. Since the pillar spacer 280 is disposed inside the retaining wall pattern 260, the problem that the pillar spacer 280 shifts when the liquid crystal display panel 200 is subjected to a lateral stress is effectively avoided, such that the phenomena of light leakage and dimness of the liquid crystal display panel 200 are avoided. The lateral stress is generated, for example, when a user wipes the liquid crystal display panel 200. Furthermore, since the retaining wall patterns of the present invention can be integrated in the original process of fabricating the liquid crystal display panel 200, additional masks and processes are not required in the method of the present invention.

Figure 6:
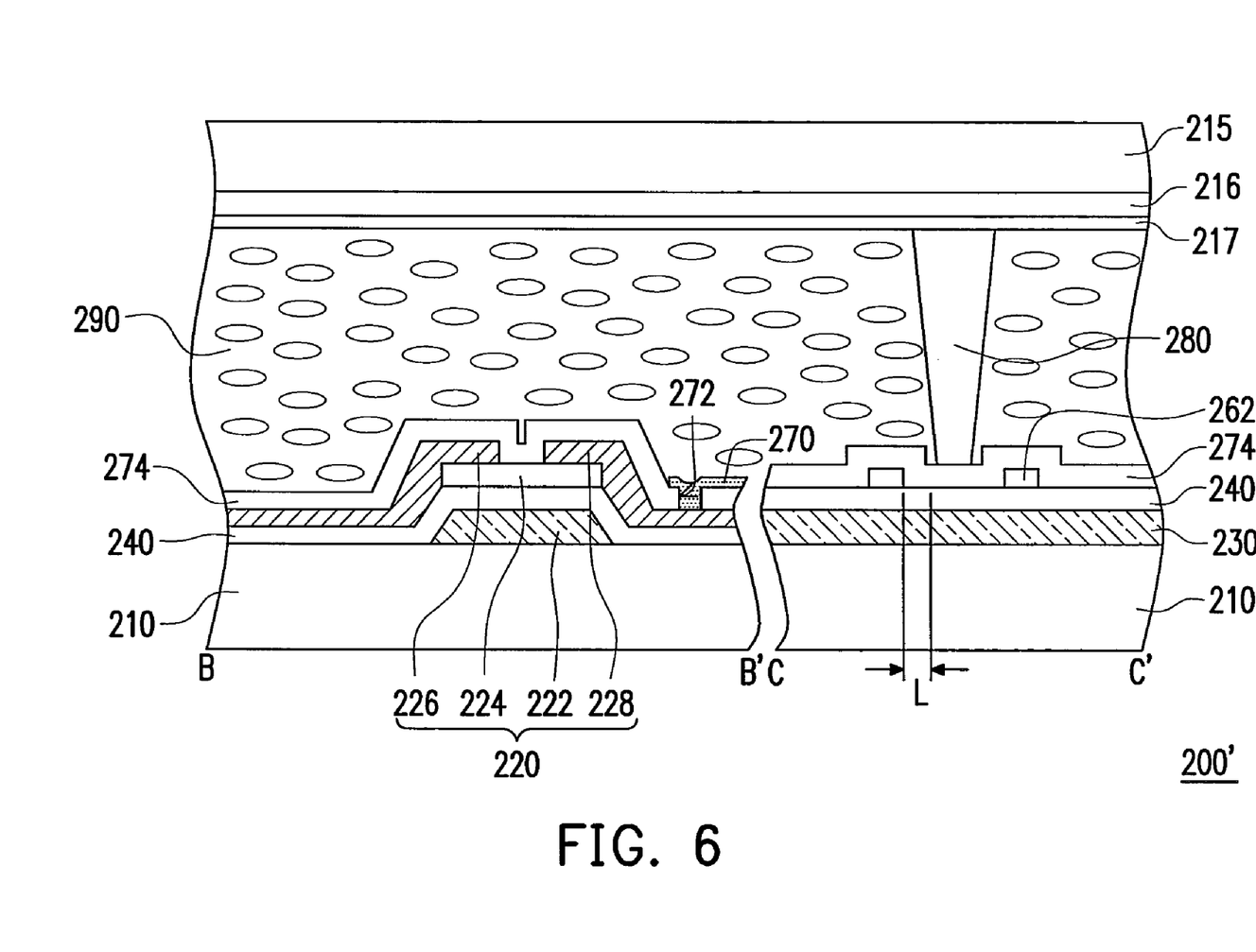
FIG. 6 is a sectional view of the liquid crystal display panel according to another embodiment of the present invention.

FIG. 6 is a sectional view of the liquid crystal display according to another embodiment of the present invention. Referring to FIG. 6, the embodiment is similar to the aforementioned embodiment except that after the insulation layer 240 is formed on the first substrate 210, the retaining wall patterns 262 are formed on the insulation layer 240 on the first substrate 210 when the channel layer 224 is formed on the insulation layer 240 over the gate 222. In other words, the retaining wall patterns 262 and the channel layer 224 are formed through the same mask, so that the material of the retaining wall pattern w 262 is the same as that of the channel layer 224. The fabrication process and structure of the source 226, the drain 228, the data line 250, the pixel electrode 270, the contact window 272, the protection layer 274, the second substrate 215, the color filter array 216, the electrode layer 217, and the pillar spacers 280 of the liquid crystal display panel 200' are the same as or similar to those mentioned above and will not be described herein.

The retaining wall patterns 262 of the liquid crystal display panel 200' in the present embodiment have the same function as the above liquid crystal display panel 200. In other words, the retaining wall patterns of the liquid crystal display panel 200' in the present embodiment can provide the effect of avoiding the phenomena of light leakage and dimness. Furthermore, since the retaining wall patterns can be integrated in the process of fabricating the liquid crystal display panel 200', additional masks and processes are not required in the method of the present invention.

The Second Embodiment

Figure 7:
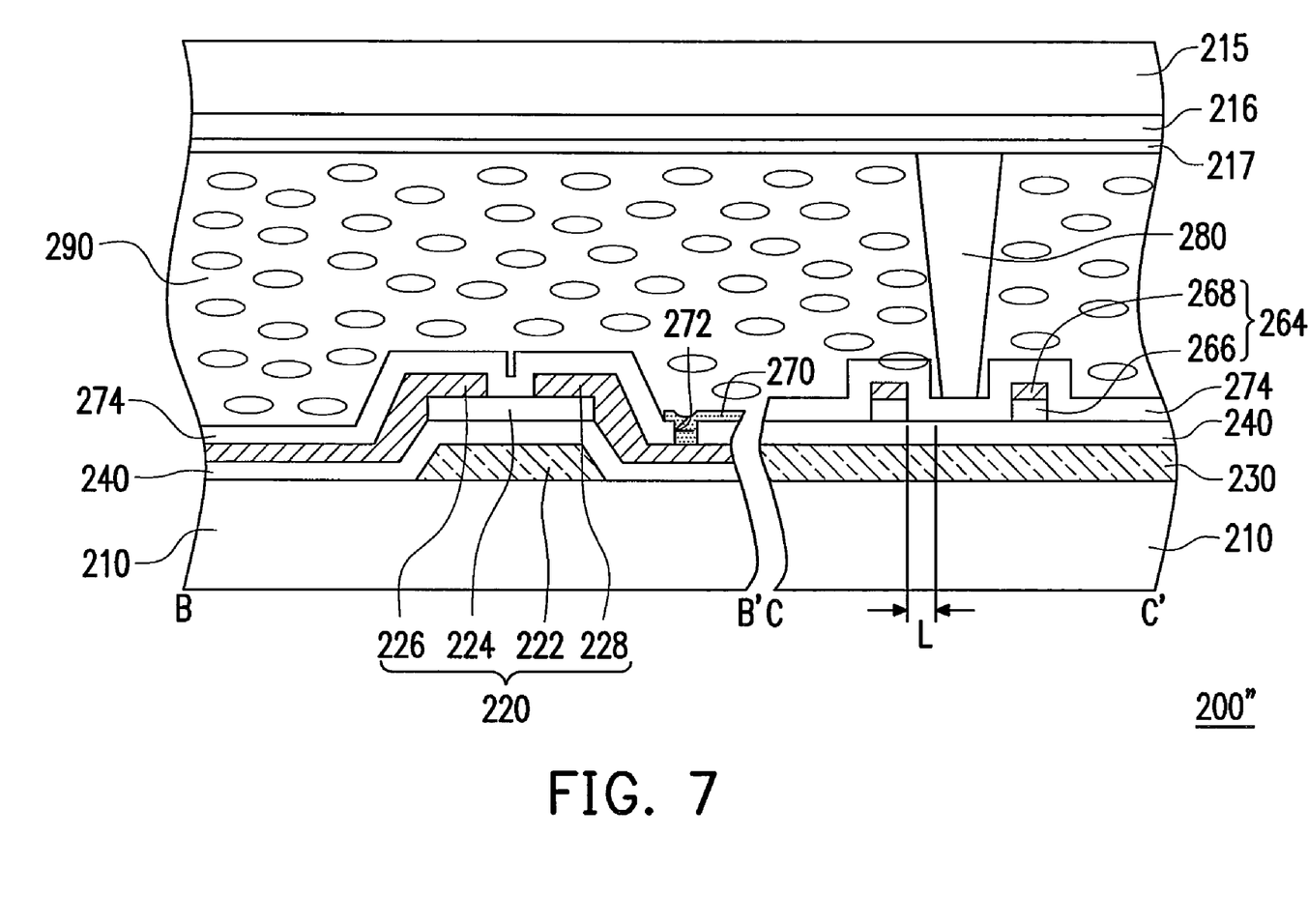
FIG. 7 is a sectional view of the liquid crystal display panel according to still another embodiment of the present invention.

FIG. 7 is a sectional view of the liquid crystal display panel according to another embodiment of the present invention. Referring to FIG. 7, the embodiment is similar to the first embodiment except that the formed retaining wall pattern 264 is a structure having a lower layer 266 and an upper layer 268. The step of fabricating the liquid crystal display panel 200" includes after the gate 222 and the insulation layer 240 are formed, the lower layer 266 of the retaining wall pattern 264 is formed when the channel layer 224 is formed on the insulation layer 240 over the gate 222. Therefore, the material of the lower layer 266 is the same as that of the channel layer 224. Then, the upper layer 268 of the retaining wall pattern 264 is formed when the source 226 and the drain 228 are formed on the channel layer 224. Therefore, the material of the upper layer 268 is the same as that of the source 226 and the drain 228. Similarly, the distance L between the pillar spacer 280 and the retaining wall pattern 264 is, for example, larger than 3 μm. The fabrication process and structure of the color filter array 216, the electrode layer 217, and the pillar spacer 280 on the second substrate 215 are the same as or similar to those mentioned above and will not be described herein.

Referring to FIG. 7, more specifically, the retaining wall pattern 264 of the present embodiment is a structure having an upper layer 268 and a lower layer 266, which is different from the single layer structure (the retaining wall patterns 260 and 262) disclosed in the first embodiment.

The Third Embodiment

Figure 8:
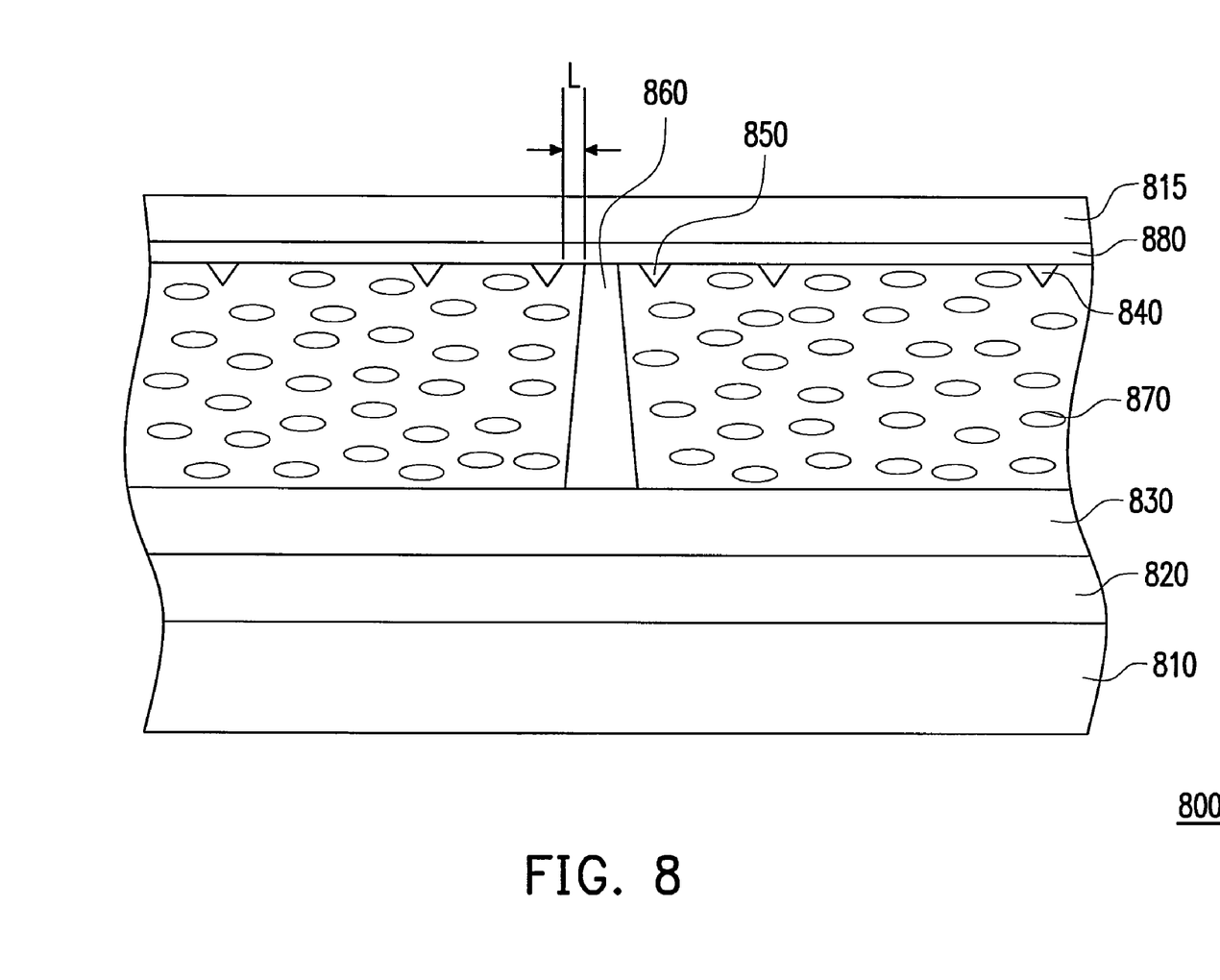
FIG. 8 is a schematic sectional view of the liquid crystal display panel according to the third embodiment of the present invention.

FIG. 8 is a schematic sectional view of the liquid crystal display panel according to the third embodiment of the present invention. Referring to FIG. 8, the liquid crystal display panel 800 comprises a first substrate 810, a pixel array 820, and a color filter array 830. The pixel array 820 and the color filter array 830 are formed on the first substrate 810. Each pixel of the pixel array 820 comprises a scan line, a data line, a TFT, and a pixel electrode (not shown), and the pixel structure can be one of the conventional pixel structures. The color filter array 830 is disposed on the pixel array 820 and the pillar spacers 860 are disposed on the color filter array 830. Additionally, the second substrate 815 is disposed opposite to the first substrate 810 and the liquid crystal display panel 870 is disposed between the first substrate 810 and the second substrate 815. Particularly, a plurality of protrusions 840 are further formed on the second substrate 815, so as to make the liquid crystal display panel 800 have a wide viewing angle. Particularly, a plurality of retaining wall patterns 850 are further disposed on the second substrate 815 and one end of the pillar spacer 860 is disposed inside the retaining wall pattern 850, wherein the material of the retaining wall pattern 850 is the same as that of the protrusions 840. According to another embodiment of the present invention, the protrusions 840 disposed at a predetermined or specific position may directly serve as the retaining wall. In one embodiment, an electrode layer 880 is further disposed on the second substrate 815 of the liquid crystal display panel 800, and the protrusions 840 and the retaining wall pattern 850 are disposed on the electrode layer 880.

More specifically, in the embodiment, the pixel array 820 and the color filter array 830 are disposed on the first substrate 810, i.e., a so-called Color Filter On Array (COA) structure. And the pillar spacer 860 is disposed on the color filter array 830. Since the liquid crystal display panel in the embodiment has the design of protrusions 840, it may also be referred to as a multi-domain vertically aligned liquid crystal display panel (MVA-LCD).

It should be noted that each of the retaining wall pattern 850 of the liquid crystal display panel 800 is also a single layer structure. Similarly, as shown in FIGS. 5A-5L, the retaining wall patterns 850 may be continuous patterns or discontinuous patterns. Each of the pillar spacer 860 is disposed inside the retaining wall pattern 850 and the distance L between the pillar spacer 860 and the retaining wall pattern 850 is larger than 3 μm. Similarly, with this design, when the liquid crystal display panel 800 is subjected to a lateral stress, the first substrate 810 and the second substrate 815 are prevented from being mismatched and the light leakage and dimness of the conventional liquid crystal display panel 100 is avoided, and thus the contrast and brilliance uniformity of the liquid crystal display panel 800 can be maintained. Additionally, since the retaining wall structure of the present embodiment can be integrated in the original process of fabricating the liquid crystal display panel with wide view, additional masks and processes are not required in the method of the present embodiment.

In view of above, in the present invention, since one end of each pillar spacer is disposed inside the retaining wall pattern, the pillar spacer is effectively prevented from shifting when the liquid crystal display panel is subjected to a lateral stress and the phenomena of light leakage and dimness of the liquid crystal display panel are avoided, and thus the contrast and brilliance uniformity of the liquid crystal display panel are maintained. Furthermore, no matter whether the retaining wall pattern is a single layer structure or a structure having an upper layer and a lower layer, the retaining wall pattern can be integrated in the original process of fabricating the liquid crystal display panel, so the additional masks and processes are not required in the method of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   a first substrate;
   a plurality of scan lines and a plurality of data lines disposed on the first substrate;
   an insulation layer, disposed between the scan lines and the data lines;
   a plurality of thin film transistors (TFT) disposed on the first substrate, wherein each of the TFTs comprises a gate, a channel layer, a source and a drain, the gate is electrically connected to one of the scan lines, and the source is electrically connected to one of the data lines;

a plurality of pixel electrodes, wherein each of the pixel electrodes is electrically connected to the drain of one of the TFTs;

a plurality of retaining wall patterns disposed on the insulation layer, wherein each of the retaining wall patterns is a single layer structure, and the material thereof is the same as that of the source and drain;

a second substrate, disposed opposite to the first substrate;

a liquid crystal layer disposed between the first substrate and the second substrate; and a plurality of pillar spacers disposed between the second substrate and the first substrate, wherein one end of each pillar spacer is disposed inside one of the retaining wall patterns on the first substrate.

2. The liquid crystal display panel as claimed in claim 1, wherein the retaining wall patterns are disposed on the insulation layer over the scan lines.

3. The liquid crystal display panel as claimed in claim 1, wherein a distance between the pillar spacer disposed inside each of the retaining wall patterns and the retaining wall pattern is larger than 3 μm.

4. The liquid crystal display panel as claimed in claim 1, wherein the retaining wall patterns are continuous retaining wail patterns or discontinuous retaining wall patterns.

5. The liquid crystal display panel as claimed in claim 1, further comprising a color filter array disposed on the second substrate, wherein the pillar spacers are disposed on the color filter array.

6. The liquid crystal display panel as claimed in claim 1, further comprising an electrode layer disposed on the second substrate, wherein the pillar spacers are disposed on the electrode layer.

* * * * *